United States Patent
Uno et al.

(10) Patent No.: US 7,468,851 B2
(45) Date of Patent: Dec. 23, 2008

(54) OPTICAL HEAD DEVICE AND OPTICAL RECORDING/REPRODUCING APPARATUS UTILIZING THE SAME

(75) Inventors: Masara Uno, Tokyo (JP); Yasuhiro Terasaki, Tokyo (JP); Nobuo Uekusa, Tokyo (JP); Yi Lang Chan, Taipei (TW)

(73) Assignees: TDK Corporation, Tokyo (JP); TDK Taiwan Corporation, Taipei (TW)

( * ) Notice: Subject to any disclaimer, the term of this patent is extended or adjusted under 35 U.S.C. 154(b) by 180 days.

(21) Appl. No.: 11/451,429

(22) Filed: Jun. 13, 2006

(65) Prior Publication Data

US 2007/0011694 A1    Jan. 11, 2007

(30) Foreign Application Priority Data

Jul. 7, 2005    (JP) .............................. 2005-199000

(51) Int. Cl.
*G02B 7/02* (2006.01)
*G11B 7/00* (2006.01)

(52) U.S. Cl. .................................... 359/824; 369/44.11
(58) Field of Classification Search ................ 359/811, 359/813, 819, 822–824; 369/44.11, 44.12, 369/44.14, 44.17
See application file for complete search history.

(56) References Cited

U.S. PATENT DOCUMENTS 5,056,891 A * 10/1991 Masunaga .................. 359/813
5,841,593 A * 11/1998 Ikegame et al. ............. 359/823
6,285,517 B1 * 9/2001 Uekusa et al. .............. 359/813
2004/0128679 A1 * 7/2004 Wade ......................... 720/681

FOREIGN PATENT DOCUMENTS

| JP | B2 03-144924 | 6/1991 |
| JP | A 2004-127415 | 4/2004 |
| KR | 2003-0050754 | 6/2003 |

* cited by examiner

*Primary Examiner*—Scott J Sugarman
*Assistant Examiner*—Dawayne A Pinkney
(74) *Attorney, Agent, or Firm*—Oliff & Berridge, PLC (57) ABSTRACT

The invention provides an optical head device in which the influence of mechanical vibration generated at resonance frequencies of high orders (second and higher orders) can be eliminated and an optical recording/reproducing apparatus utilizing the same. Sidewalls are formed from both ends of a sidewall constituting the top side of a trapezoidal contour of a lens holder portion, the sidewalls extending in the form of a fan to define a predetermined angle between them. A damping system includes a weight in the form of a metal thin plate and a visco-elastic adhesive for bonding the weight to the sidewalls. The visco-elastic adhesive transfers vibration of the lens holder in the direction of an optical axis of an objective lens to the weight and has a viscous damping property which damps vibration of the weight in the direction of the optical axis.

9 Claims, 7 Drawing Sheets

OPTICAL HEAD DEVICE AND OPTICAL RECORDING/REPRODUCING APPARATUS UTILIZING THE SAME

BACKGROUND OF THE INVENTION

1. Field of the Invention

The present invention relates to an optical head device and an optical recording/reproducing apparatus utilizing the same.

2. Description of the Related Art

In general, an optical head device is constituted by an objective lens driver (actuator) including an objective lens and an optical system for transmitting and receiving light through the objective lens, and it has a structure in which the objective lens driver is disposed on a mount base of an optical system block.

An objective lens driver generally comprises a lens holder which holds an objective lens, a focus coil, and a tracking coil and a fixed member which includes a magnetic circuit. The lens holder is cantilevered on the fixed member with a plurality of elastic support members.

Figure 6:
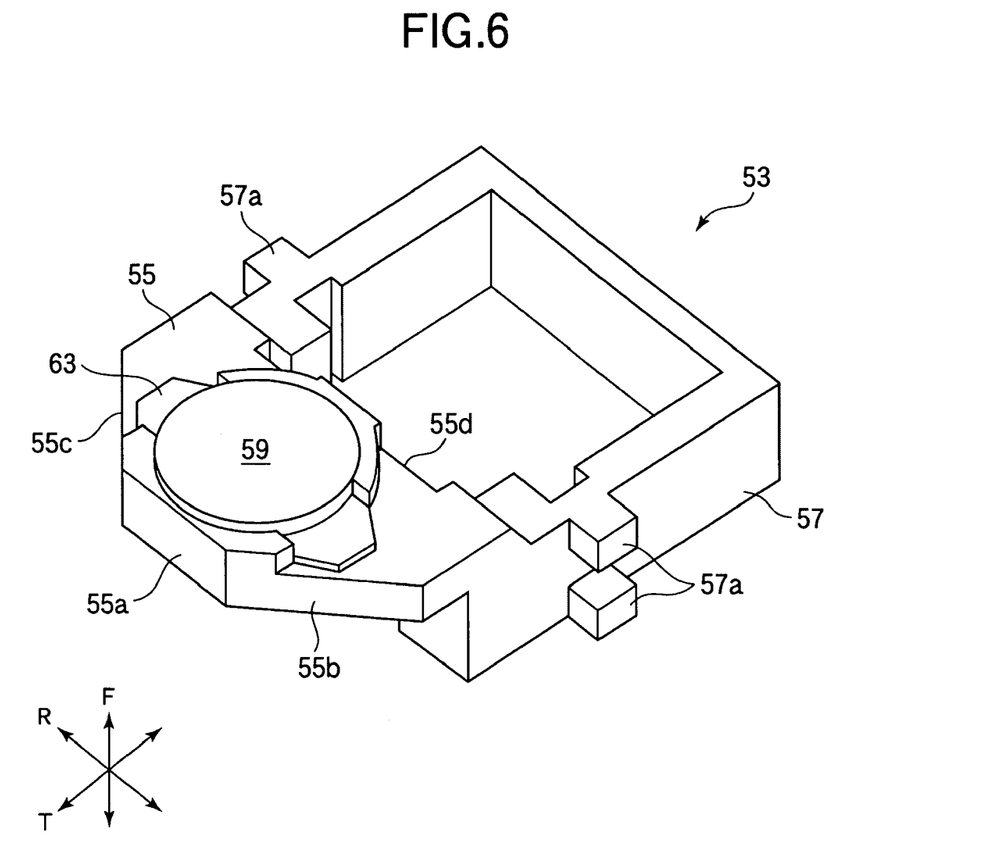
FIG. 6 is a perspective view showing a schematic configuration of a lens holder 53 according to the related art.

FIG. 6 is a perspective view of a lens holder 53 which holds an objective lens 59. The arrow extending in the vertical direction in FIG. 6 represents a focus position control direction F in which the position of a lens holding portion 55 is controlled using focus servo, and the two arrows which are substantially orthogonal to the above-mentioned arrow and to each other represent a tracking position control direction (the radial direction of an optical recording medium) R in which the position of the lens holding portion 55 is controlled using tracking servo and a direction T tangential to a track of the optical recording medium. The description applies to directions F, R, and T shown in FIGS. 7A, 7B, and 7C.

As shown in FIG. 6, the lens holder 53 includes the lens holding portion 55 holding the objective lens 59 which has a cylindrical periphery, and the holder also includes a frame-shaped portion 57 having frame walls around which a coil (not shown) is mounted to form a magnetic circuit in combination with a magnet. An opening in the form of a hollow cylinder (not shown) for allowing light to impinge on the objective lens 59 is provided substantially in the middle of the lens holding portion 55. A lens setting portion 63 is formed around the opening to allow the objective lens 59 to be securely set. A peripheral sidewall of the lens holding portion 55 on the side of the lens setting portion 63 has a trapezoidal contour in the form of a convex protruding on one side in the direction T when viewed in the direction in which the objective lens 59 is placed. Sidewalls 55b and 55c are formed to extend from both ends of a sidewall 55a which constitutes the top side of the trapezoid, the sidewalls extending in the form of a fan to define a predetermined angle between them.

The opening of the lens holding portion 55 is provided such that the center axis of the opening is offset from the center axis of the frame-shaped portion 57 a predetermined distance. Rectangular wire connecting portions 57a are formed outside two sidewalls of the frame-shaped portion 57 extending in a face-to-face relationship from both ends of the lens holding portion 55, conductive wires being connected to the connecting portions to serve as elastic support members and also to energize coils which are not shown.

In order to perform focusing (focus position adjustment) and tracking (adjustment to a track position) of the objective lens 59 on an information recording surface of a rotating optical recording medium, a focus servo signal and a tracking servo signal are supplied from the conductive wires which are not shown to a focus coil and a tracking coil (both of which are not shown) mounted on the frame-shaped portion 57 of the lens holder 53. As a result, forces are generated to move the coils in predetermined directions under the influence of a magnetic field of a magnet (not shown) provided inside the frame-shaped portion 57, and the objective lens 59 fixed on the lens holder 53 is moved by resultant driving forces to perform focusing and tracking.

Figure 7A:
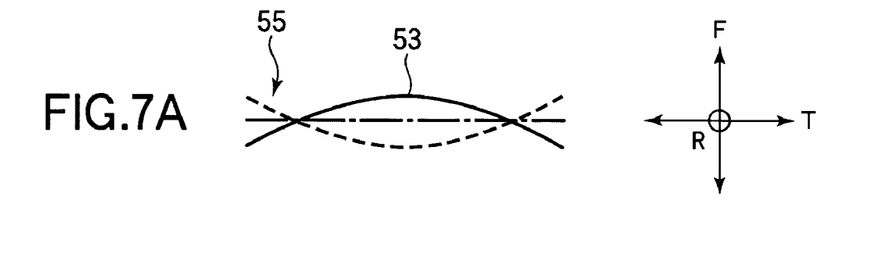
FIGS. 7A, 7B, and 7C schematically show adverse modes of vibration in a focus position control direction F of the lens holder 53 according to the related art.
Figure 7B:
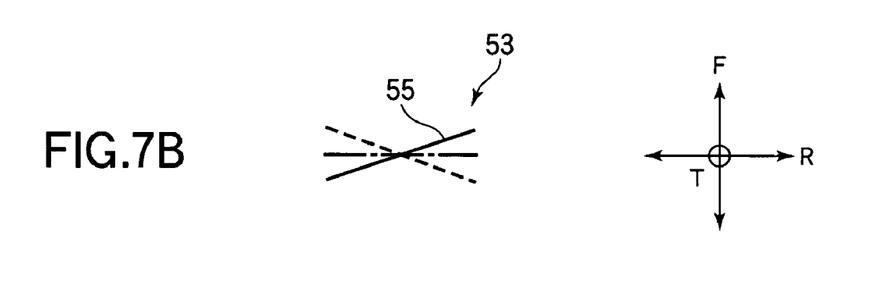
Figure 7C:
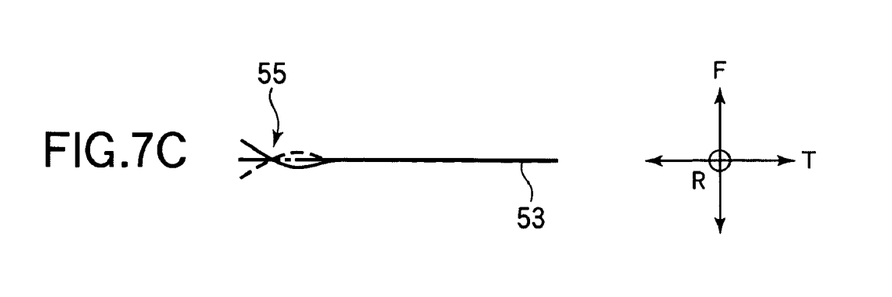

Since the objective lens 59 must be positioned in a predetermined position at a very high speed and high accuracy, the focus servo signal and the tracking servo signal are temporal waveforms that are close to a step function. For this reason, those servo signals include frequency components in a wide band ranging from DC (direct current) to several tens kHz (e.g., 50 kHz or higher). Therefore, applying a driving force to the lens holder 53 based on a servo signal is to vibrate the lens holder 53 in the wide frequency band ranging from DC to several tens kHz from a different point of view. The lens holder 53 has a plurality of resonance frequencies exit depending on the shape and material thereof. When vibrated at those resonance frequencies, the lens holder 53 vibrates in a natural mode of vibration associated with each resonance frequency. FIGS. 7A, 7B, and 7C schematically show adverse resonance modes in the focus position control direction F of the lens holder 53. In FIGS. 7A and 7C, a single line schematically represents a section of the lens holder 53 taken along an imaginary plane including an optical axis of the objective lens 59 and extending in parallel with the direction T. In FIG. 7B, a single line schematically represents a section of the lens holding portion 55 taken along an imaginary plane including the optical axis of the objective lens 59 and extending in parallel with the direction R. In FIGS. 7A, 7B, and 7C, a state of the lens holder 53 or lens holding portion 55 at rest is represented by a chain line, and maximum and minimum amplitudes of those elements in a mode of vibration are represented by a solid line and a broken line, respectively.

For example, when the lens holder 53 has the structure shown in FIG. 6, resonance frequencies fr2, fr3, and fr4 of high orders (second, third, and fourth orders) exist near 20 kHz, 40 kHz, and 50 kHz. When the lens holder 53 is vibrated at the second-order resonance frequency fr2, the lens holder 53 is displaced in the direction F in a plane including the directions T and F as shown in FIG. 7A. Thus, the lens holder 53 vibrates in a bending mode in which an anti-node of vibration is generated substantially in the middle of the lens holder and in which a node of vibration is generated in positions slightly inward from both ends of the lens holder 53. When the lens holder 53 is vibrated at the third-order resonance frequency fr3, the lens holder 53 is displaced in the direction F in a plane including the directions R and F as shown in FIG. 7B. Thus, there will be torsional vibration about an axis in the direction T in which a node of vibration is generated substantially in the middle of the lens holder 53 and in which both ends of the lens holder 53 become anti-nodes of vibration in phase opposition. Further, when the lens holder 53 is vibrated at the fourth-order frequency fr4, the lens holder 53 is displaced in the direction F in the plane including the directions T and F at the lens holding portion 55 at the left end thereof as shown in FIG. 7C. Thus, there will be rolling vibration in which a node of vibration is generated substantially in the middle of the lens holding portion 55 and in which an anti-node of vibration is generated at an end of the lens holding portion 55. First-order resonance is resonance of a wire suspension which has nothing to do with the rigidity of the lens holder 53.

Figure 8:
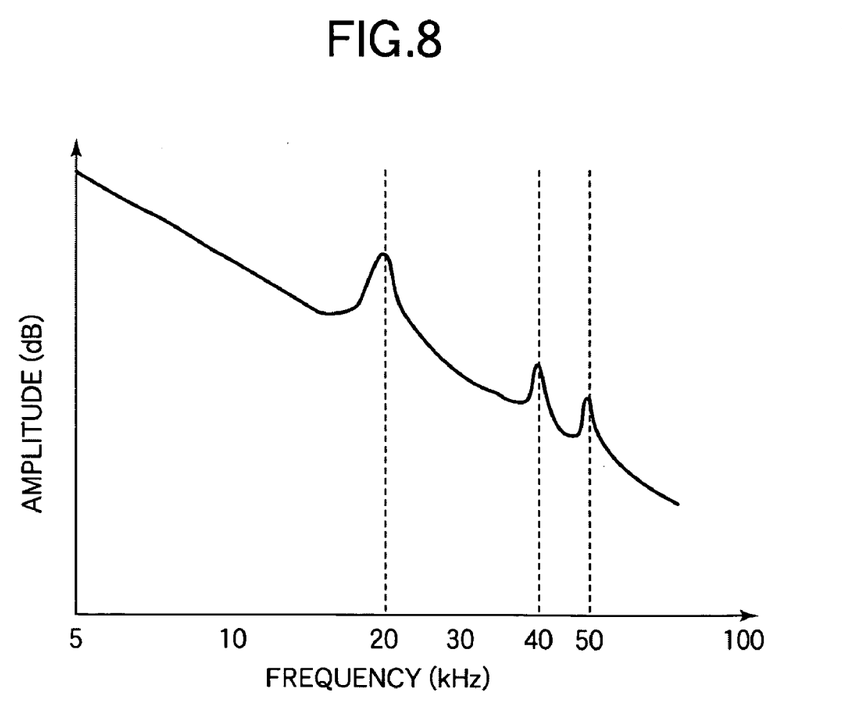
FIG. 8 is a Bode diagram showing vibration transfer characteristics of the lens holder 53 according to the related art.

FIG. 8 is a Bode diagram representing vibration transfer characteristics of the lens holder 53. Frequencies (kHz) are shown along the abscissa axis in logarithms, and amplitudes of a transfer function are shown along the ordinate axis in decibels (dB). The curve in FIG. 8 represents transfer characteristics measured in a position slightly away from an extremity of the protrusion of the objective lens 59 held by the lens holder 53 toward the optical recording medium. The transfer characteristics shown in FIG. 8 indicate that the lens holder 53 is subjected to vibration in a natural mode of vibration at resonance frequencies fr2=20 kHz, fr3=40 kHz, and fr4=50 kHz.

Since the objective lens 59 is held by the lens holding portion 55, the lens vibrates together with the holder in the above-mentioned mode of vibration. As a result, the vibration of the objective lens 59 in that mode of vibration constitutes a disturbance (noise) which makes a focus servo system and a tracking servo system unstable and which consequently increases the risk of oscillation of the systems. Since focusing control and tracking control can no longer be performed once oscillation occurs, a spot of a laser beam from the optical head device cannot follow up a track formed on the information recording surface of the optical recording medium in an optimum focus position. Further, since a sufficiently high system gain cannot be achieved when it is attempted to suppress the oscillation, a problem arises in that the objective lens 59 cannot be accurately positioned at a high speed.

As a solution to the problem, Patent Documents 1 discloses a driver for an objective lens of an optical pickup having an objective lens holder rotatable about an axis of rotation and movable up and down, in which the objective lens is placed on the objective lens holder; a balancer for balancing the weight of the objective lens holder is mounted on an extreme peripheral surface of the objective lens holder opposite to the position where the objective lens is mounted, the balancer being mounted using an adhesive having adhesive properties such that the mounting surface is in parallel with the direction of vibration or resonance of the objective lens holder as a result of control or driving of the objective lens; and vibrational energy is absorbed by distortion of the adhesive.

Patent Document 2 discloses a technique for preventing vibration of a lens holder which is cantilevered on a fixed member with a plurality of elastic support members similar to those in the structure shown in FIG. 6. Specifically, a lens holding portion of the lens holder in Patent Document 2 protrudes from a coil holding portion which holds a driving coil. The lens holding portion is provided substantially in the form of a ring to concentrate vibrations in a focusing direction and to suppress them with a first vibration absorbing member. Further, ribs are eliminated from the lens holding portion to concentrate vibrations in a tracking direction and to suppress them with a second vibration absorbing member. That is, the first vibration absorbing member is provided in a position corresponding to the sidewall 55a of the lens holding portion 55 of the lens holder 53 shown in FIG. 6, and the second vibration absorbing member is provided in positions corresponding to the two regions where the lens holding portion 55 and the frame-shaped portion 57 join each other.

Patent Document 1: Japanese Patent No. 2598530
Patent Document 2: JP-A-2004-127415

However, it is a prerequisite for the technique in Patent Document 1 to apply it to an objective lens holder rotatable about an axis of rotation and movable up and down, and the technique cannot be applied to a lens holder which is cantilevered on a fixed member with a plurality of elastic support members as shown in FIG. 6.

Referring to the configuration shown in FIG. 1 of Patent Document 2, since a vibrational component in a focus position control direction F is damped by a single vibration absorbing member in the configuration, it is difficult to suppress torsional vibration about an axis in a direction T. In the configuration shown in FIGS. 4A and 4B of the document, although torsional vibration can be suppressed, it is necessary to provide vibration absorbing members at least in three locations, which result in a problem in that a cost increase is caused by complicated manufacturing steps. There is another problem in that the configuration results in an increase in the size of an apparatus because a sufficient space must be provided to mount the vibration absorbing members.

Further, in any of the configurations disclosed in Patent Documents 1 and 2, it is difficult to achieve an effect of damping all adverse modes of vibration based on second-order, third-order, and fourth-order resonance frequencies simultaneously.

SUMMARY OF THE INVENTION

It is an object of the invention to provide an optical head device from which the influence of mechanical vibration generated at resonance frequencies of high orders (second and higher orders) can be eliminated and to provide an optical recording/reproducing apparatus utilizing the same.

The above-described object is achieved by an optical head device characterized in that it includes a lens holder for holding an objective lens, a wire for movably cantilevering the lens holder, and a pair of damping systems mounted on two sidewalls of the lens holder respectively, the sidewalls being located on both sides of an imaginary plane which includes an optical axis of the objective lens and which is in parallel with the extending direction of the wire.

An optical head device according to the invention is characterized in that the damping systems damp the amplitude of vibration of the lens holder in the direction of the optical axis.

An optical head device according to the invention is characterized in that the phase of vibration of the damping systems is inverted by 180° from the phase of the vibration of the lens holder in a frequency band above and inclusive of a second-order resonance frequency of the lens holder.

An optical head device according to the invention is characterized in that a resonance frequency of the damping systems is lower than the second-order resonance frequency of the lens holder.

An optical head device according to the invention is characterized in that the pair of damping systems vibrates in a phase opposite to the phase of vibration of the sidewalls to which the pair of damping systems are mounted in a mode of vibration in which the both sidewalls vibrate in phase opposition to each other.

An optical head device according to the invention is characterized in that the damping systems include a weight and a visco-elastic adhesive for bonding the weight to the sidewalls, the adhesive transferring vibration of the lens holder in the direction of the optical axis to the weight and having a viscous damping property which damps vibration of the weight in the direction of the optical axis.

An optical head device according to the invention is characterized in that the weight has a shape like a thin plate and in that the visco-elastic adhesive provides a planar connection between a surface of the thin-plate-like shape and the sidewalls.

An optical head device according to the invention is characterized in that the lens holder further includes a frame-shaped portion having a frame structure which is offset from the optical axis of the objective lens.

An optical head device according to the invention is characterized in that the lens holder has a trapezoidal contour which protrudes oppositely to the frame-shaped portion and which is in a substantially symmetric relationship with the imaginary plane and in that the pair of damping systems are mounted on first and second sidewalls, respectively, the sidewalls extending in the form of a fan from both sides of a top side sidewall constituting the top side of the trapezoid to define a predetermined angle between the top side sidewall and the first and the second sidewalls.

The above-described object is achieved by an optical recording/reproducing apparatus characterized in that it includes an optical head device according to the invention.

The invention makes it possible to provide n optical head device from which the influence of mechanical vibration generated at resonance frequencies of high orders (second and higher orders) can be eliminated and to provide an optical recording/reproducing apparatus utilizing the same.

DESCRIPTION OF THE PREFERRED EMBODIMENT

Figure 1:
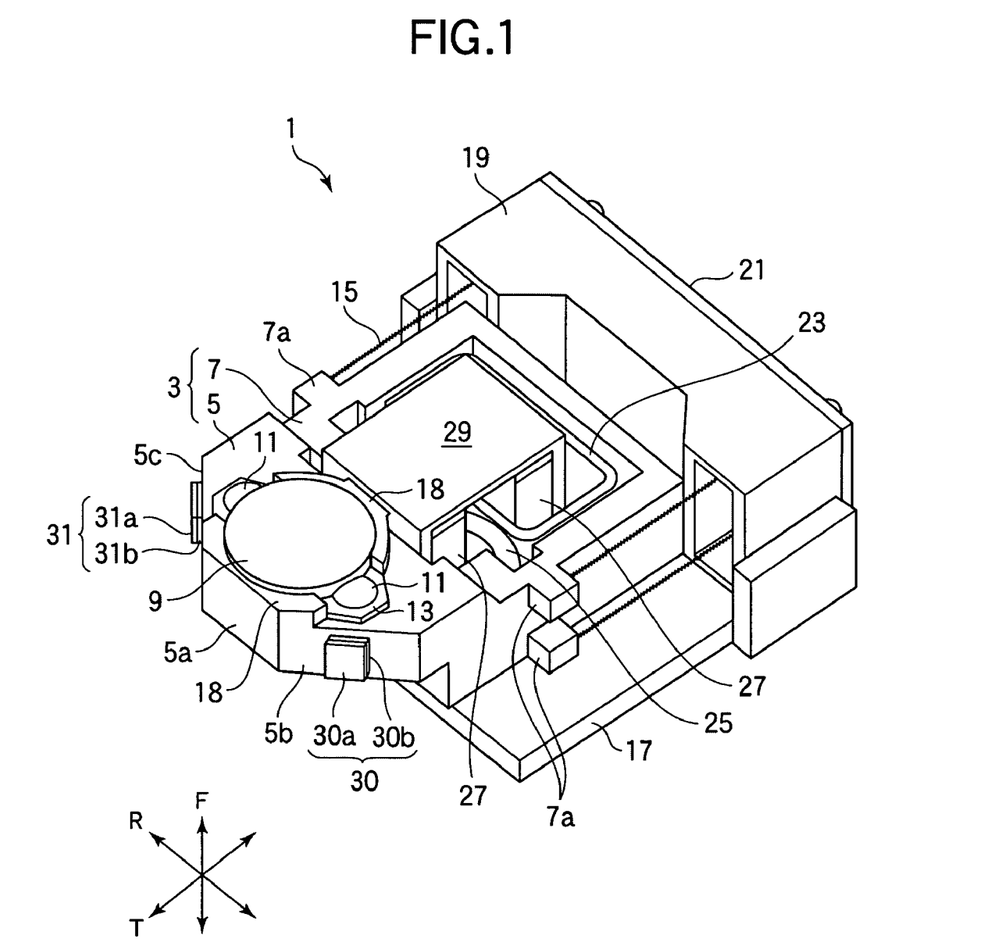
FIG. 1 is a perspective view showing a schematic configuration of an objective lens driver 1 provided in an optical head device according to an embodiment of the invention.

A description will now be made with reference to FIGS. 1 to 5 on an optical head device and an optical recording/reproducing apparatus utilizing the same according to an embodiment of the invention. First, a schematic configuration of the optical head device of the present embodiment will be described with reference to FIG. 1. FIG. 1 is a perspective view showing a configuration of an objective lens driver 1 of the optical head device of the present embodiment. The arrow extending in the vertical direction in FIG. 1 represents a focus position control direction F in which the position of a lens holding portion 5 is controlled using focus servo, and the two arrows which are substantially orthogonal to the above-mentioned arrow and to each other represent a tracking position control direction (the radial direction of an optical recording medium) R in which the position of the lens holding portion 5 is controlled using tracking servo and a direction T tangential to a track of the optical recording medium.

As shown in FIG. 1, a lens holder 3 holds an objective lens 9 which faces an information recording surface of an optical recording medium (not shown) and irradiates the information recording surface of the optical recording medium with a light beam by converging the beam on the surface to record or reproduce information. The lens holder 3 is formed from a resin material. For example, a liquid crystal polymer may be used as the resin material. Various types of engineering plastics may be used as the resin material as long as desired moldability and rigidity is provided.

The lens holder 3 includes the lens holding portion 5 holding the objective lens 9 which has a cylindrical periphery, and the holder also includes a frame-shaped portion 7 which forms a square frame body having a hollow in combination with sidewalls of the lens holding portion 5. A lens setting portion 13 is formed substantially in the middle of the lens holding portion 5 to allow the objective lens 9 to be securely set. Lens holding sidewall portions 18 in the form of walls facing each other are formed in parts of the periphery of the lens setting portion 13 so as to protrude above the other parts of the same. Inner walls of the two lens holding sidewall portions 18 opposite to each other are formed to face a cylindrical circumferential sidewall of the objective lens 9 in compliance to the sidewall with a predetermined gap left between them such that the objective lens 9 can be easily accommodated. For example, the objective lens 9 is secured to the lens holder 3 by applying and setting (dispensing) an optically or thermally setting adhesive 11 made of resin between the sidewalls of the lens setting portion 13 and the objective lens 9. An opening (not shown) in the form of, for example, a hollow cylinder for allowing light to impinge on the objective lens 9 is provided substantially in the middle of the lens holding portion 5. A peripheral sidewall of the lens holding portion 5 on the side of the lens setting portion 13 has a trapezoidal contour in the form of a convex protruding on one side in the direction T of the opposite side of the frame-shaped portion 7 when viewed in the direction in which the objective lens 9 is placed. The trapezoidal contour is in a substantially symmetric relationship with an imaginary plane including an optical axis of the objective lens 9 and extending in parallel with the direction T. Sidewalls (first and second sidewalls) 5b and 5c are formed to extend from both ends of a sidewall 5a which constitutes the top side of the trapezoid, the sidewalls extending in the form of a fan to define a predetermined angle between them.

Damping systems 30 and 31 are mounted to the sidewalls 5b and 5c, respectively, which are located on both sides of the imaginary plane including the optical axis of the objective lens 9 and extending in parallel with the direction T. The damping systems 30 and 31 are provided in the vicinity of the objective lens 9. The damping system 30 includes a weight 30a in the form of a metal thin plate and a visco-elastic adhesive 30b for bonding the weight 30a to the sidewall 5b. The visco-elastic adhesive 30b transfers vibration of the lens holder 3 in the direction of the optical axis of the objective lens 9 to the weight 30a and has a viscous damping property which damps vibration of the weight 30a in the direction of the optical axis. The visco-elastic adhesive 30b provides a planar connection between a surface of the thin-plate-like shape of the weight 30a and the side wall 5b. The damping system 31 includes a weight 31a in the form of a metal thin plate and a visco-elastic adhesive 31b for bonding the weight 31a to the sidewall 5c. The visco-elastic adhesive 31b transfers vibration of the lens holder 3 in the direction of the optical axis of the objective lens 9 to the weight 31a and has a viscous damping property which damps vibration of the weight 31a in the direction of the optical axis. The visco-elastic adhesive 31b provides a planar connection between a surface of the thin-plate-like shape of the weight 31a and the side wall 5c.

The objective lens 9 secured to the lens holding portion 5 is disposed with the optical axis thereof offset from the center axis of the frame-shaped portion 7 a predetermined distance.

Secured to an inner wall of the frame-shaped portion 7 are a focus coil 23 whose coil portion is partially wound along the frame wall and a tracking coil 25 whose coil portion is wound such that the center axis of the same is formed in a direction orthogonal to the center axis of the focus coil 23. Two magnets 27 facing each other across a predetermined gap are provided to protrude from a base yoke 17 provided under the lens holder 3 in the figure. One of the magnets 27 is provided on the inner circumferential side of the focus coil 23, and the other magnet 27 is provided between the tracking coil 25 and the lens holding portion 5. A top yoke 29 having a C-shaped section is provided with the open side thereof facing downward so as to sit astride the two magnets 27. The top yoke 29 and the base yoke 17 prevent a magnetic flux generated by the magnets 27 from leaking out its magnetic path. A magnetic circuit is formed by the two magnets, the top yoke 29, and the base yoke 17.

A plurality of substantially rectangular wire connecting portions 7a are formed outside two sidewalls of the frame-shaped portion 7 extending in a face-to-face relationship from both ends of the lens holding portion 5, a plurality of conductive wires 15 being connected to the wire connecting portions respectively to serve as elastic support members and also to energize the coils (two each wires being provided on both sides in the present embodiment). In order to supply servo signals (currents) to the focus coil 23 and the tracking coil 25, each end of the coils 23 and 25 is connected to a wire connecting portion 7a and securely connected with an end of a wire 15, for example, using soldering. The other ends of the wires 15 are secured to a damper case 19, for example, using soldering. Thus, the lens holder 3 is movably cantilevered on a fixed portion which is constituted by the yoke base 17, the top yoke 29, the magnets 27, the damper case 19, and a substrate 21 secured to the damper case 19.

The optical head device having the objective lens driver 1 is disposed such that surfaces of the two magnets 27 facing each other are in parallel with the tracking position control direction R, and the focus coil 23 and the tracking coil 25 inside the frame-shaped portion 7 are energized. Then, according to the Fleming's left-hand rule, a driving force causing a movement in the focus position control direction F is generated at the coil portion of the focus coil 23 sandwiched between the two magnets 27, and a driving force causing a movement in the tracking position control direction R is generated at the coil portion of the tracking coil 25 sandwiched between the two magnets 27. As a result, the objective lens 9 can be moved in a direction substantially perpendicular to the information recording surface of the optical recording medium to adjust the focus position, and the objective lens 9 can be moved also in the radial direction R of the optical recording medium to adjust the tracking position.

Figure 2:
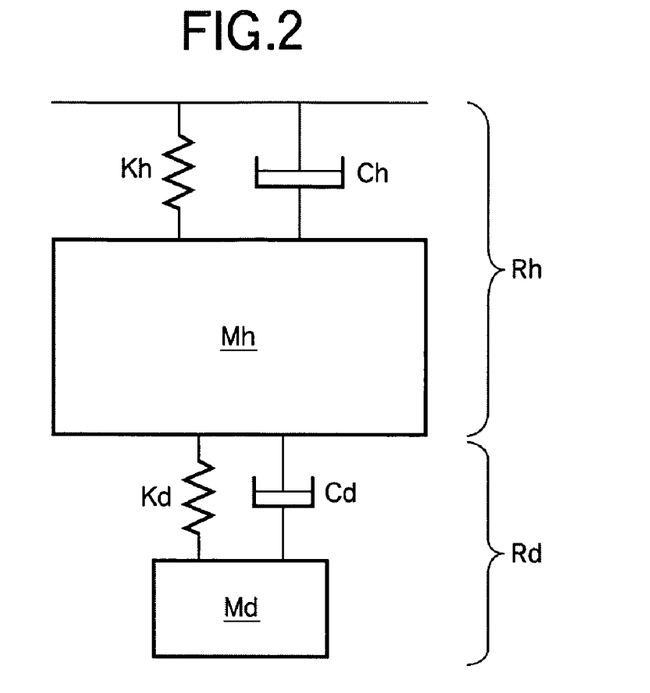
FIG. 2 shows models of vibration of a lens holder 3 and damping systems 30 and 31 provided in the optical head device according to the embodiment of the invention.

FIG. 2 shows a model of vibration of the lens holder 3 and the damping systems 30 and 31. The lens holder 3 is represented by a vibration system Rh having a degree of freedom of 1 in which a mass point having a mass Mh is connected to a fixed end at a spring constant Kh and a viscosity coefficient Ch. The damping systems 30 and 31 are represented by a vibration system Rd having a degree of freedom of 1 in which a mass point having a mass Md equivalent to the weights 30a and 31a is connected to the sidewalls 5b and 5c of the lens holder 3 at a spring constant Kh and a viscosity coefficient Ch of the visco-elastic adhesive 30 band 31b. The vibration mode of each of second-order resonance, third-order resonance, and fourth-order resonance can be expressed by the model of vibration shown in FIG. 2.

Energy loss (attenuation of energy) can be identified by multiplying the viscosity coefficient by speed (dx/dt). Therefore, the vibration system Rd has a greater damping effect, the greater the difference in speed between the vibration system Rh and the vibration system Rd. What is required is therefore that the phase of vibration of the vibration system Rd is inverted by 180° from the phase of vibration of the vibration system Rh at a frequency lower than the second-order resonance frequency of the vibration system Rh. The use of such a vibration system Rd makes it possible to achieve an effect of damping the amplitude of vibration with a highest efficiency at high-order resonance frequencies of the vibration system Rh. By inverting the phase of vibration of the vibration system Rd at 180° from the phase of vibration of the vibration system Rh in a frequency band above and inclusive of a predetermined frequency, the effect of damping the amplitude of vibration can be achieved in all vibration modes at high-order resonance frequencies of the vibration system Rh.

Figure 3A:
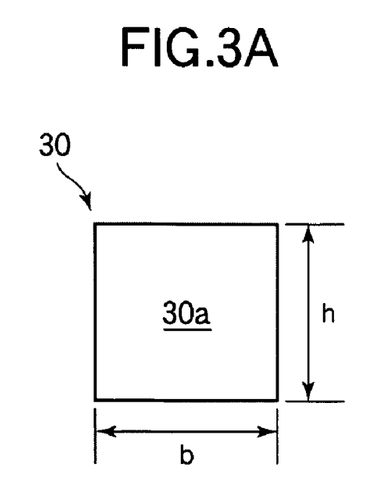
FIGS. 3A and 3B show dimensions of the damping system 30 provided in the optical head device according to the embodiment of the invention.
Figure 3B:
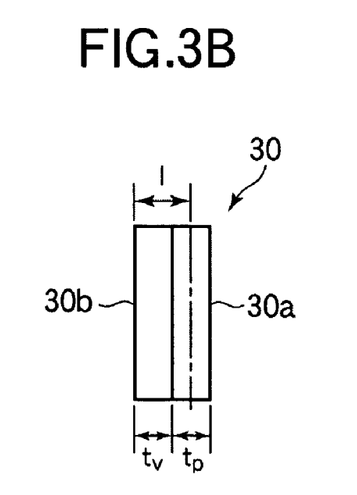

Next, a specific configuration of the damping systems 30 and 31 will be described with reference to FIGS. 3A and 3B. Since the damping systems 30 and 31 are identical in configuration, the description will be made by referring to the damping system 30 by way of example. FIGS. 3A and 3B show dimensions of the damping system 30. FIG. 3A is a view of a surface of the damping system 30 taken in a direction normal thereto, and FIG. 3B shows one side of the damping system 30. The visco-elastic adhesive 30b and the weight 30a are combined to form the single damping system 30, and the resonance frequency of the damping system 30 itself is set lower than (e.g., at about one-half) the resonance frequency of the lens holder 3.

Let us consider the damping system 30 a cantilever whose fixed end of the sidewall 5b. Then, the cantilever has a section which is a rectangle having a damper height h (m) and a damper breadth b (m), and a resonance frequency frd of the damping system 30 can be expressed by Expression 1 where a damper arm length is l (m).

$$frd = (1/2\pi)\sqrt{(K/m)} \qquad \text{Expression 1}$$
$$= (1/4\pi)\sqrt{(Ebh^3/ml^3)}$$

In Expression 1, K represents the spring constant of the visco-elastic adhesive 30b; E represents the Young's modulus of the visco-elastic adhesive 30b; and m represents the mass of the weight 30a. The spring constant K of the visco-elastic adhesive 30b can be expressed by Expression 2;

$$K=3EI/l^3 \qquad \text{Expression 2}$$

In Expression 2, I represents the geometrical moment of inertia of the visco-elastic adhesive 30b which can be expressed by Expression 3.

$$I=bh^3/12 \qquad \text{Expression 3}$$

For example, let us assume that the lens holder 3 has a second-order resonance frequency fr2 of 20 kHz. Then, it is desirable to set the resonance frequency of the damping systems 30a and 30b at 10 kHz. The reason is that the phase of vibration of the damping systems 30a and 30b is inverted by 90° at a peak of the amplitude of vibration when the resonance frequency is 10 kHz and inverted completely or by 180° at 20 kHz. In order to set the resonance frequency frd of the damping systems 30 and 31 at 10 kHz, it is required that b=0.002 (m); h=0.002 (m); l=0.0006 (m); m=0.00001392 (kg); E=3250000 (Pa); the relative density of the weight 30a is 8.7; the thickness tp of the weight 30a is 0.0004 (m); and the visco-elastic adhesive 30b has a thickness tv of 0.0004 (m).

When those parameters are substituted in Expressions 1 to 3, the resonance frequency frd of the damping system 30a is obtained at 10465.1466 (Hz).

Figure 4A:
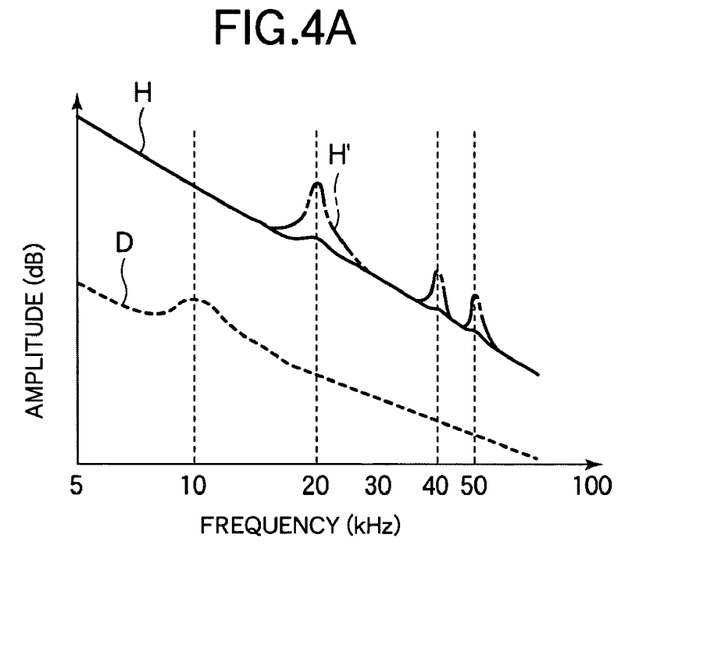
FIGS. 4A and 4B are Bode diagrams showing vibration transfer characteristics of the lens holder 3 and the damping systems 30 and 31 provided in the optical head device according to the embodiment of the invention.
Figure 4B:
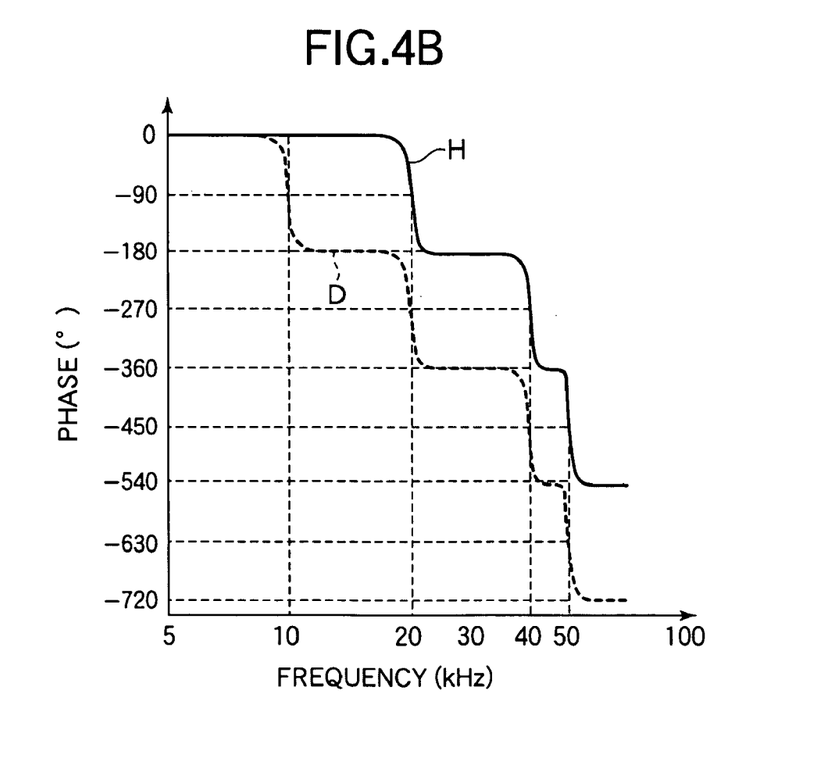

FIGS. 4A and 4B are examples of Bode diagrams representing vibration transfer characteristics of the lens holder 3 and the damping systems 30 and 31. FIG. 4A shows transfer characteristics of the amplitudes of vibration of the lens holder 3 and the damping systems 30 and 31. Frequencies (kHz) are shown along the abscissa axis in logarithms, and amplitudes of a transfer function are shown along the ordinate axis in decibels (dB). FIG. 4B shows frequency characteristics of the phases of vibration of the lens holder 3 and the damping systems 30 and 31. Frequencies (kHz) are shown along the abscissa axis in logarithms, and phases (°) are shown along the ordinate axis. The curves H in solid lines in FIGS. 4A and 4B represent transfer characteristics measured in a position slightly away from an extremity of the protrusion of the objective lens 9 held by the lens holder 3 toward the optical recording medium. The curves D in broken lines represent transfer characteristics measured on sidewalls of the weights 30a and 30b of the damping systems 30 and 31 on the side of the optical recording medium. The curve H' shown in a chain line in an overlapping relationship with the curve H in FIG. 4A represents transfer characteristics of the lens holder 53 according to the related art.

As shown in FIGS. 4A and 4B, when the vibration frequency of the lens holder 3 is on the order of about 7 kHz or less, the difference between the phases of vibration of the damping systems 30 and 31 and the lens holder 3 is substantially 0 because the damping systems 30 and 31 follow up the vibration of the lens holder 3. When the vibration frequency of the lens holder 3 exceeds 7 kHz, the damping systems 30 and 31 do not follow up the vibration of the lens holder 3, and a difference begins to grow between the phases of vibration of the damping systems 30 and 31 and the lens holder 3. Since the damping systems 30 and 31 are formed so as to resonate at about 10 kHz, they resonate with a greater amplitude when the vibration frequency of the lens holder 3 becomes 10 kHz. The phase of the damping systems 30 and 31 is inverted by 90° from the initial phase at the resonance frequency frd of 10 kHz.

When the vibration frequency of the lens holder 3 becomes about 15 kHz, the phase of the damping systems 30 and 31 is inverted by 180° from the initial phase. As the vibration frequency of the lens holder 3 approaches a second-order resonance frequency fr2=20 kHz, the phase of the lens holder 3 starts shifting from the initial phase, and the phase is inverted by 90° at 20 kHz. On the contrary, the phase of the damping systems 30 and 31 is inverted with the phase difference from the lens holder 3 maintained. As shown in FIG. 4B, the phase difference between the lens holder 3 and the damping systems 30 and 31 is 180° at the second-order resonance frequency fr2 of 20 kHz. There is relativity between the vibration of the lens holder 3 and the vibration of the damping systems 30 and 31, and no change occurs in the relationship between the phases of the lens holder 3 and the damping systems 30 and 31 regardless of the phase that the lens holder 3 assumes while moving in response to an external input. The relative speed between the lens holder 3 and the damping systems 30 and 31 is thus maximized, and the damping systems 30 and 31 can therefore damp the amplitude of the vibration of the lens holder 3 with a highest efficiency. As a result, as shown in FIG. 4A, the objective lens driver 1 provided in the optical head device of the present embodiment can sufficiently reduce vibration attributable to resonance generated at the second-order resonance frequency fr2 of 20 kHz when compared to an objective lens driver according to the related art.

At a third-order resonance frequency fr3=40 kHz, the damping systems 30 and 31 have the same effect on the lens holder 3 as that exerted at the second-order resonance frequency fr2, and vibration attributable to resonance can be sufficiently reduced as shown in FIG. 4A. As shown in FIG. 7B, the mode of vibration at the third-order resonance frequency fr3 is torsional vibration at the lens holding portion 5 about an axis in the direction T. Therefore, the sidewalls 5b and 5c of the lens holder 3 vibrate in phase opposition at the third-order resonance frequency fr3. The phase of the damping systems 30 and 31 is always at an inversion of 180° from the phase of the vibration of the lens holder 3 in a frequency band above and inclusive of the frequency at which the systems are inverted by 180° from the initial phase thereof. Therefore, the damping systems 30 and 31 vibrate in a phase opposite to the phase of the vibration of the sidewalls 5b and 5c. As a result, the damping systems 30 and 31 can sufficiently reduce the amplitude of resonant vibration with a highest efficiency also in the case of torsional vibration about an axis in the direction T.

At a fourth-order resonance frequency fr4=50 kHz, the damping systems 30 and 31 have the same effect on the lens holder 3 as that exerted at the second-order resonance frequency fr2, and vibration attributable to resonance can be sufficiently reduced as shown in FIG. 4A when compared to an objective lens driver according to the related art as shown in FIG. 4A.

As described above, according to the present embodiment, the pair of damping systems 30 and 31 is provided on the sidewalls 5b and 5c of the lens holder 3 on the side thereof where the objective lens 9 is provided, and the resonance frequency of the damping systems 30 and 31 is set at substantially one-half of the second resonance frequency fr2 of the lens holder 3. As a result, it is possible to reduce peaks of the amplitude of vibration at second-order resonance and resonance of higher orders (third and fourth orders) and to eliminate the influence of mechanical vibration generated at second and higher order resonance frequencies sufficiently. The damping systems 30 and 31 are formed and disposed so as to be able to reduce vibration in a bending mode (second-order resonance), torsional vibration (third-order resonance) of the lens holding portion 5 generated when the lens holder 3 moves in the tangential direction, and rolling vibration (fourth-order vibration) of the lens holding portion 5 generated when the lens holder 3 moves in the focus position control direction F. Since the objective lens driver 1 can absorb vibration in all modes of vibration with one type of damping systems as thus described, the space utilization of the optical head device is significantly improved.

An optical recording/reproducing apparatus according to the present embodiment will now be described. For example, the optical recording/reproducing apparatus includes an optical head device for recording information in predetermined regions of a plurality of tracks formed along the circumferential direction of a disk-shaped optical recording medium so as to repeat in the radial direction of the optical recording medium and for reproducing information recorded in predetermined regions of the tracks. Optical head devices include recording-only types used only for recording information on an optical recording medium, reproduction-only types used only for reproduction of information, and recording/reproducing types which can be used for both recording and reproduction. While apparatus carrying those types of devices therefore constitute optical recording apparatus, optical reproducing apparatus, and optical recording/reproducing apparatus, respectively, all of those apparatus are collectively referred to as "optical recording/reproducing apparatus".

Figure 5A:
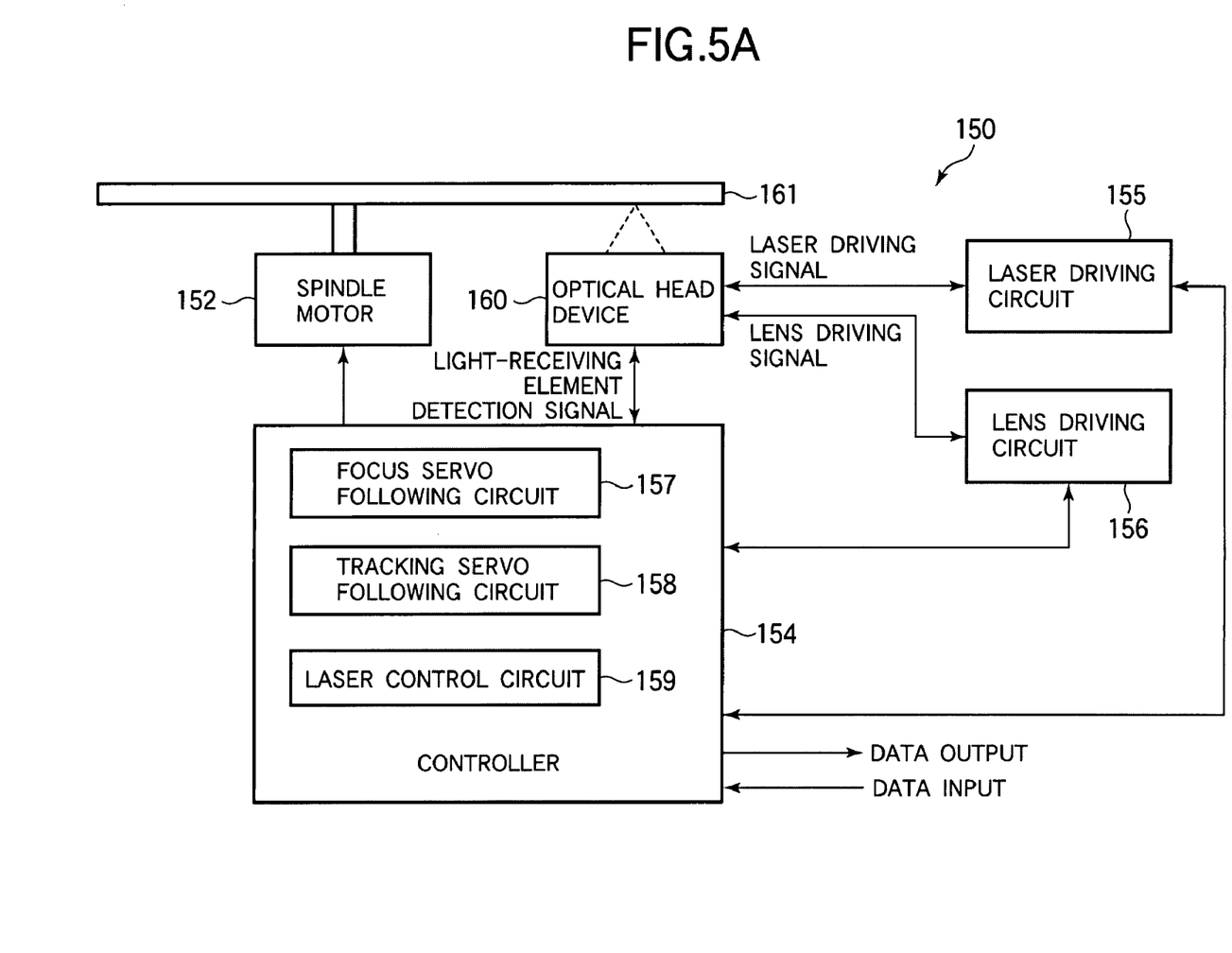
FIG. 5A shows a schematic configuration of an optical recording/reproducing apparatus 150 according to the embodiment of the invention.

FIG. 5A shows a schematic configuration of an optical recording/reproducing apparatus 150 carrying an optical head device 160 according to the present embodiment. As shown in FIG. 5A, the optical recording/reproducing apparatus 150 includes a spindle motor 152 for rotating an optical recording medium 161, the optical head device 160 which irradiates the optical recording medium 161 with a laser beams and receives reflected light from the same, a controller 154 for controlling the operations of the spindle motor 152 and the optical head device 160, a laser driving circuit 155 for supplying a laser driving signal to the optical head device 160, and a lens driving circuit 156 for supplying a lens driving signal to the optical head device 160.

The controller 154 includes a focus servo following circuit 157, a tracking servo following circuit 158, and a laser control circuit 159. When the focus servo following circuit 157 operates, focus servo is activated on an information recording surface of the optical recording medium 161 that is rotating. When the tracking servo following circuit 158 operates, a spot of a laser beam automatically follows up any eccentric signal track on the optical recording medium 161. The focus servo following circuit 157 and the tracking servo following circuit 158 have an automatic gain control function for automatically adjusting a focus gain and an automatic gain control function for automatically adjusting a tracking gain, respectively. The laser control circuit 159 is a circuit for generating the laser driving signal supplied by the laser driving circuit 155, and the circuit generates a proper laser driving signal based on recording condition setting information recorded in the optical recording medium 161.

It is not essential that the focus servo following circuit 157, the tracking servo following circuit 158, and the laser control circuit 159 are circuits incorporated in the controller 154, and they may be components separate from the controller 154. Further, it is not essential that they are physical circuit, and they may be programs executed in he controller 154.

The invention is not limited to the above-described embodiment and may be modified in various ways.

While the above description has referred to the lens holder 3 of the so-called lens offset type in which the optical axis of the objective lens 9 and the center of the frame-shaped portion 7 are offset by way of example, the invention is not limited to the same. For example, the invention may be applied to a lens holder of the so-called lens center type in which an objective lens is disposed substantially in the middle of the lens holder.

What is claimed is:

1. An optical head device comprising:
   a lens holder for holding an objective lens;
   a wire for movably cantilevering the lens holder; and
   a pair of damping systems mounted on two sidewalls of the lens holder respectively, the sidewalls being located on both sides of an imaginary plane which includes an optical axis of the objective lens and which is in parallel with the extending direction of the wire,
   wherein the damping systems include a weight and a viscoelastic adhesive for bonding the weight to the sidewalls, the adhesive transferring vibration of the lens holder in the direction of the optical axis to the weight and having a viscous damping property which damps vibration of the weight in the direction of the optical axis.

2. An optical head device according to claim 1, wherein the damping systems damp the amplitude of vibration of the lens holder in the direction of the optical axis.

3. An optical head device according to claim 2, wherein the phase of vibration of the damping systems is inverted by 180° from the phase of the vibration of the lens holder in a frequency band above and inclusive of a second-order resonance frequency of the lens holder.

4. An optical head device according to claim 3, wherein a resonance frequency of the damping systems is lower than the second-order resonance frequency of the lens holder.

5. An optical head device according to claim 4, wherein the pair of damping systems vibrate in a phase opposite to the phase of vibration of the sidewalls to which the pair of damping systems are mounted in a mode of vibration in which the both sidewalls vibrate in phase opposition to each other.

6. An optical head device according to claim 1, wherein the weight has a shape like a thin plate and wherein the viscoelastic adhesive provides a planar connection between a surface of the thin-plate-like shape and the sidewalls.

7. An optical head device according to claim 1, wherein the lens holder further includes a frame-shaped portion having a frame structure which is offset from the optical axis of the objective lens.

8. An optical head according to claim 7, wherein the lens holder has a trapezoidal contour which protrudes oppositely to the frame-shaped portion and which is in a substantially symmetric relationship with the imaginary plane and in that the pair of damping systems are mounted on first and second sidewalls, respectively, the sidewalls extending in the form of a fan from both sides of a top side sidewall constituting the top side of the trapezoid to define a predetermined angle between the top side sidewall and the first and the second sidewalls.

9. An optical recording/reproducing apparatus comprising an optical head device according to claim 1.

* * * * *

UNITED STATES PATENT AND TRADEMARK OFFICE
CERTIFICATE OF CORRECTION

PATENT NO.       : 7,468,851 B2
APPLICATION NO.  : 11/451429
DATED            : December 23, 2008
INVENTOR(S)      : Masaru Uno et al.

Page 1 of 1

It is certified that error appears in the above-identified patent and that said Letters Patent is hereby corrected as shown below:

On the title page,
Please replace the first inventor name as follows:

(75) Inventors: Masaru Uno, Tokyo (JP)

Signed and Sealed this

Seventeenth Day of March, 2009

JOHN DOLL
*Acting Director of the United States Patent and Trademark Office*